JOSIAH J. ALLEN.
Improvement in Drying Houses.
No. 124,998. Patented March 26, 1872.
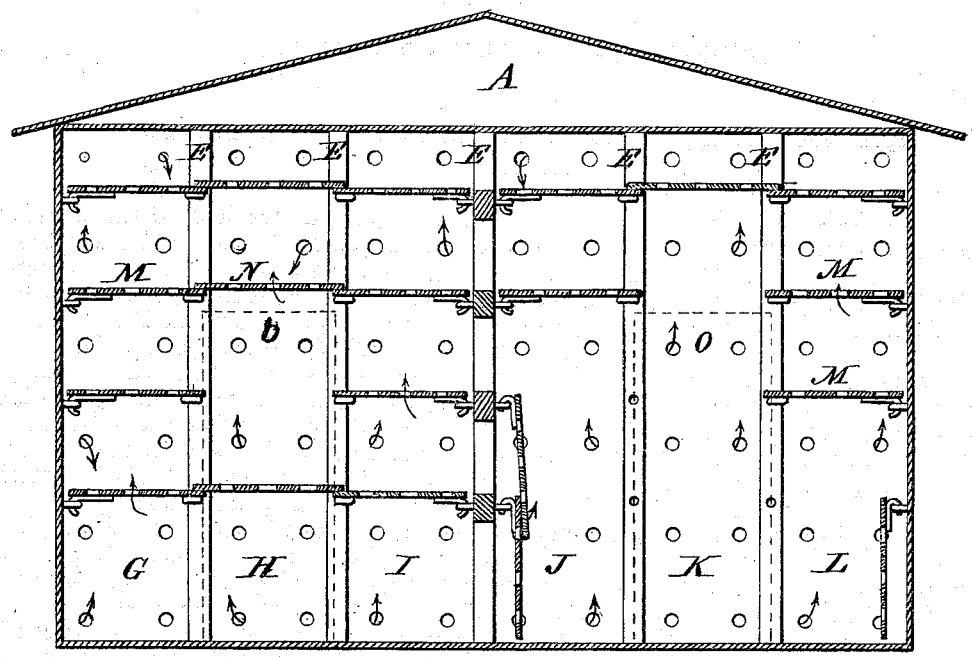
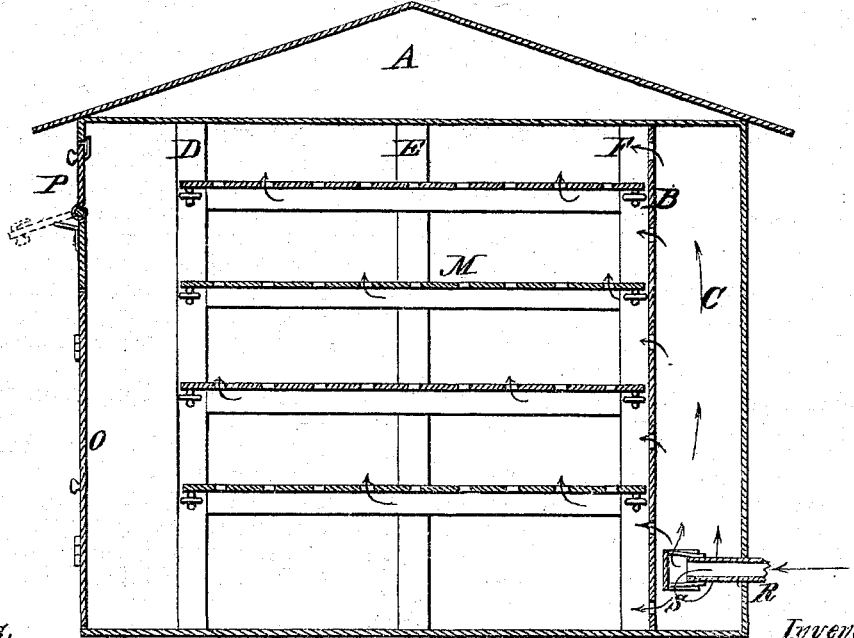
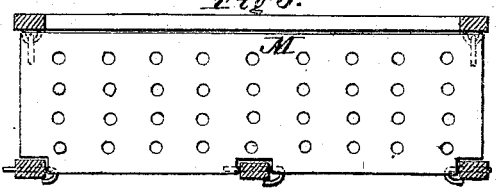

UNITED STATES PATENT OFFICE.

JOSIAH J. ALLEN, OF PHILADELPHIA, PENNSYLVANIA.

IMPROVEMENT IN DRYING-HOUSES.

Specification forming part of Letters Patent No. 124,998, dated March 26, 1872.

SPECIFICATION.

*To all whom it may concern:*

Be it known that I, JOSIAH J. ALLEN, of Philadelphia, in the county of Philadelphia and State of Pennsylvania, have invented certain Improvements in Dry-Houses, of which the following is a specification, reference being had to the accompanying drawing.

My invention relates to dry-houses; and consists in a certain novel construction and arrangement of the parts of the same, as hereinafter explained.

In the drawing, Figure 1 is a longitudinal vertical section of my dry-house. Fig. 2 is a transverse vertical section of the same. Fig. 3 is a plan view of one of the shelves detached.

A represents the dry-house, made of any size desired, out of any suitable materials, and preferably in the form of an oblong rectangle, as shown. B is a partition running lengthwise through the house a short distance from its rear side, so as to form an air-chamber, C, as shown in Fig. 2. D, E, and F are three rows of posts arranged within the house, as shown in both figures, the front row D being a short distance from the front of the house, as shown in Fig. 2. In a house of the size represented these posts are arranged so as to make six spaces from front to rear between these posts, as shown in Fig. 1, and are represented by the letters G, H, I, J, K, and L, respectively. To the ends of the house, and to each side of the posts between the spaces I and J, are pivoted in any convenient manner a series of shelves, M, with notches in their front ends, so that they may be turned up and receive in these notches the opposite posts, and be held there by pins passing through the posts under them, or, when desired, to turn down and hang, as clearly shown in Fig. 1. When these shelves are being arranged the spaces H and K serve as passage-ways, and as the shelves are arranged in place these passage-ways may also be supplied with loose shelves N, as shown in the same figure. In the front of the house and opposite the passage-ways entrance-doors O are placed, as shown in Fig. 2 and in dotted lines in Fig. 1, and also over these doors and near the top of the house a door, P, is hung longitudinally so as to turn down, as shown in Fig. 2, for purposes of ventilation when desired. In the rear side of the house, and near the bottom, is placed a tube, R, with an air-deflector, S, on its inner end. The partition B and the shelves are all perforated. The shelves may be made of perforated wood or metal, or of any material that will allow a free circulation of air.

This dry-house is intended for drying hair, wool, fish, glue, bones, animal matter, or other substances. In using it the operator enters the doors O, fastens up his shelves M, and places thereon the materials to be dried; he then arranges the loose shelving N and covers them, thus utilizing the entire space. The doors O are then closed and the ventilator P, if desired, opened. When everything is arranged hot or cold dry air is forced in through the tube R, which circulates throughout the house and passes out through the ventilator P.

The advantages of a dry-house thus constructed are many. It furnishes a large amount of shelving, or, when desired, only a small amount; it allows the air to circulate freely throughout; it permits easy access to all the shelves. When not in use the shelves may be turned down out of the way, and whenever desired to thoroughly renovate and clean the house they may be removed therefrom.

Having thus described my invention, what I claim is—

A dry-house provided with perforated partition B, air-chamber C, and a series of pivoted removable shelves, M, air-pipe R, and ventilator P, the whole constructed, arranged, and operated substantially as herein described.

JOSIAH JOHNSON ALLEN.

Witnesses:
A. P. ALLEN,
GEO. C. SHELMERDIEN.